Figure 1:
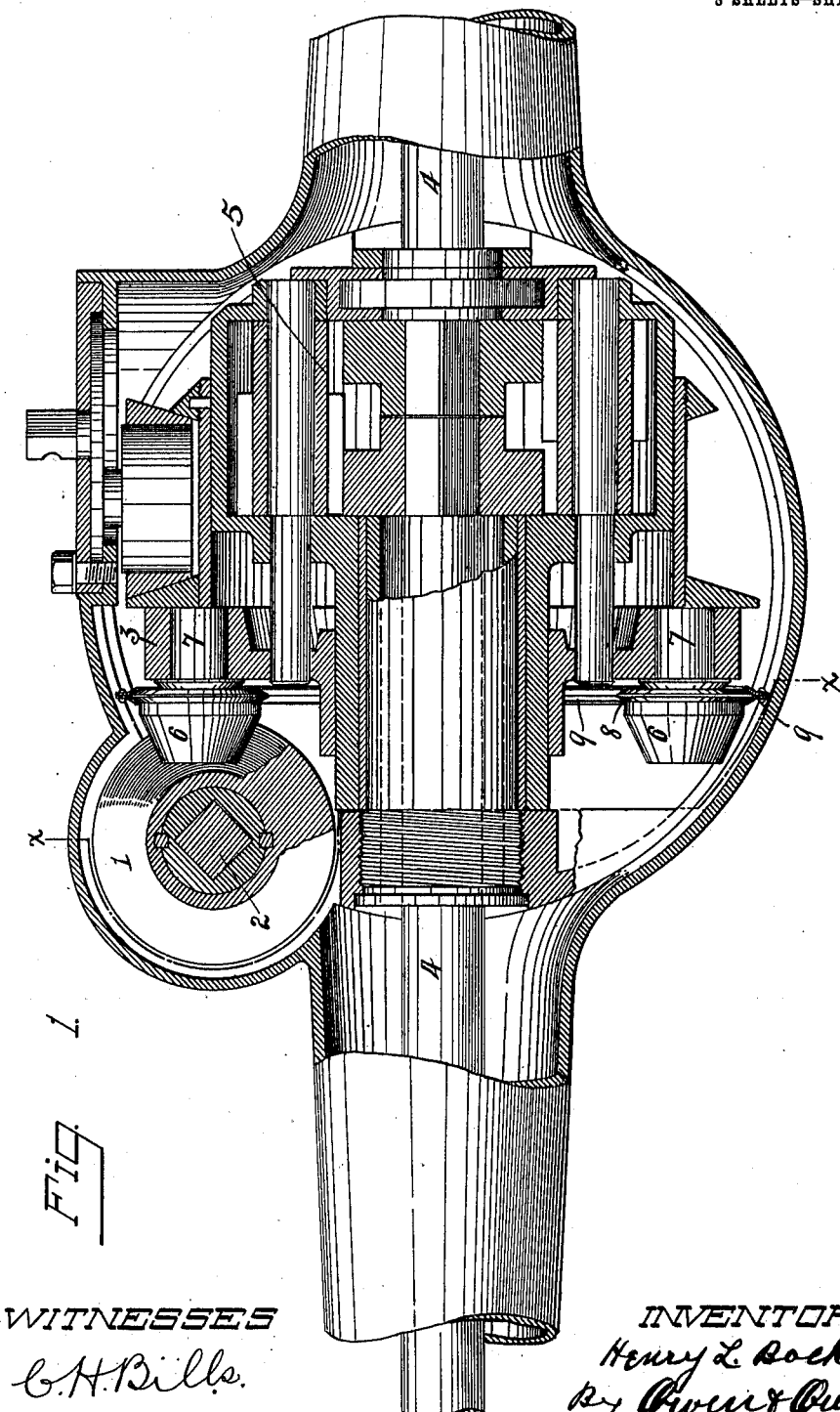

H. L. BOCK.
POWER TRANSMISSION MECHANISM.
APPLICATION FILED DEC. 19, 1910.

990,101.

Patented Apr. 18, 1911.
3 SHEETS—SHEET 1.

WITNESSES
C. H. Bills.
M. H. Haskell

INVENTOR.
Henry L. Bock.
By Owen & Owen,
His attys.

H. L. BOCK.
POWER TRANSMISSION MECHANISM.
APPLICATION FILED DEC. 19, 1910.
990,101.
Patented Apr. 18, 1911.
3 SHEETS—SHEET 2.
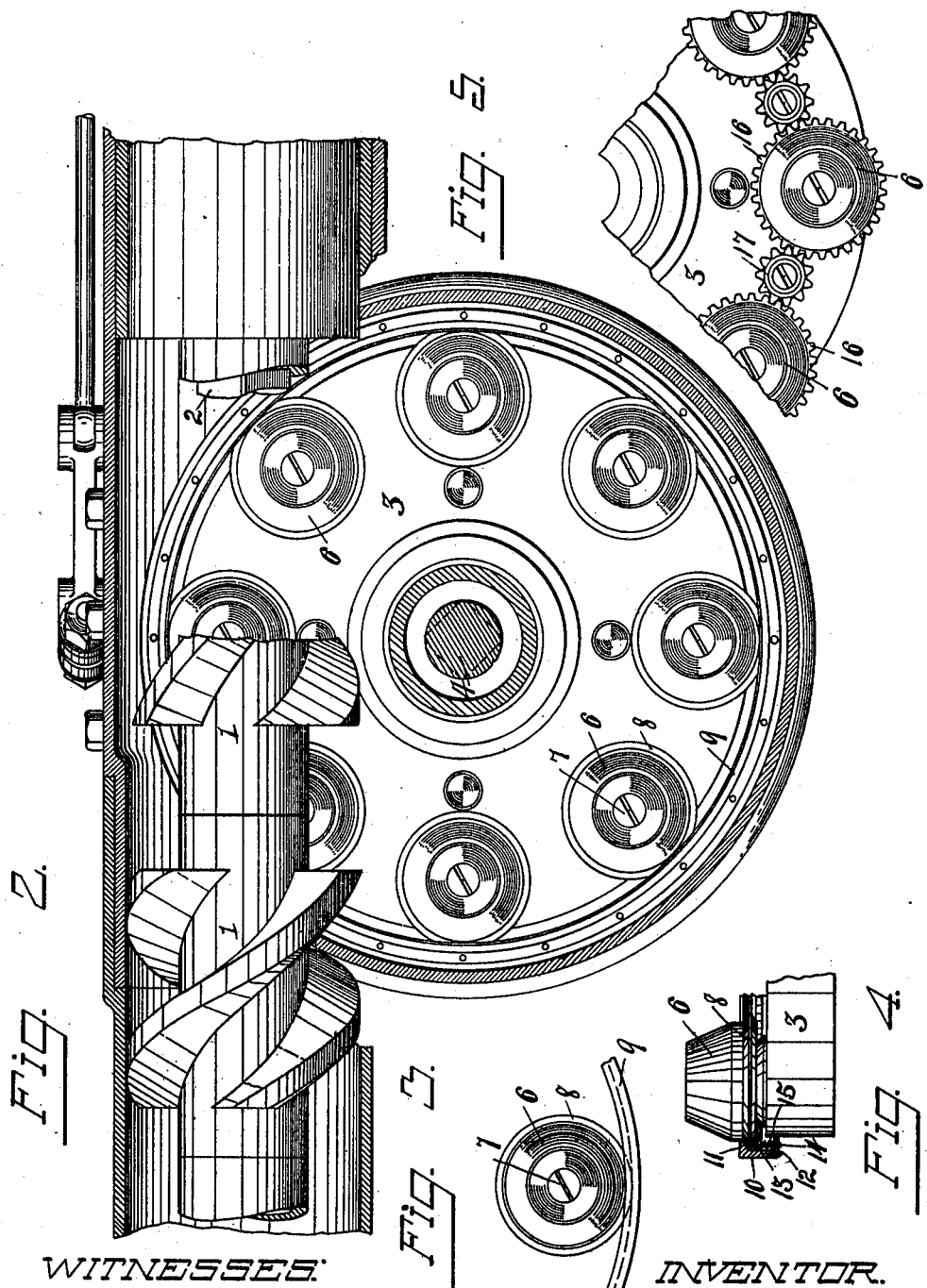
WITNESSES
C. H. Bills.
M. Haskell
INVENTOR.
Henry L. Bock.
By Owen & Owen,
His attys.

H. L. BOCK.
POWER TRANSMISSION MECHANISM.
APPLICATION FILED DEC. 19, 1910.
990,101.
Patented Apr. 18, 1911.
3 SHEETS—SHEET 3.
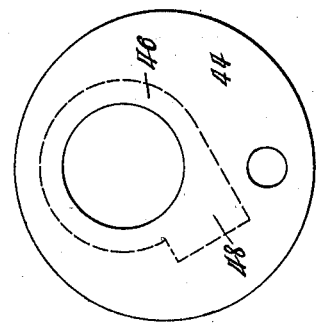
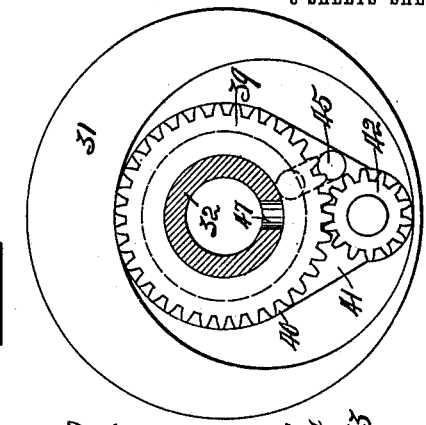
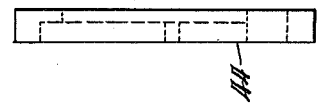
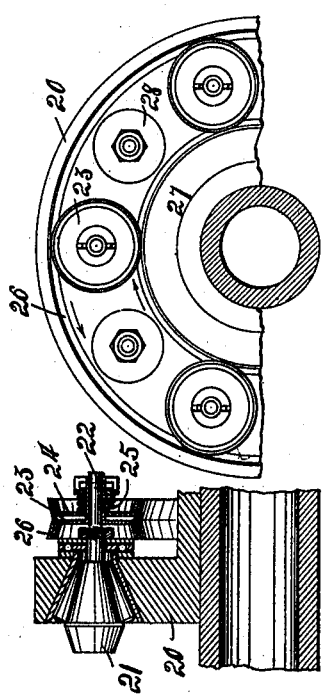
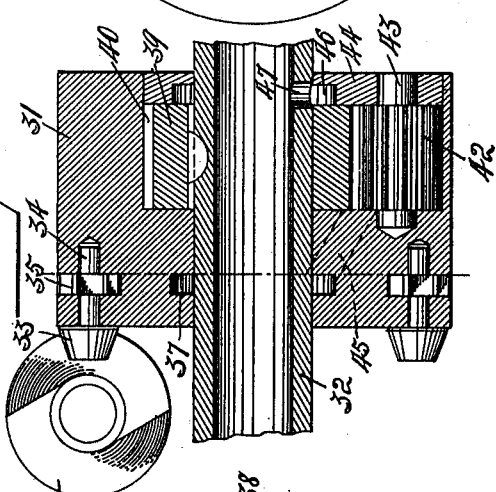
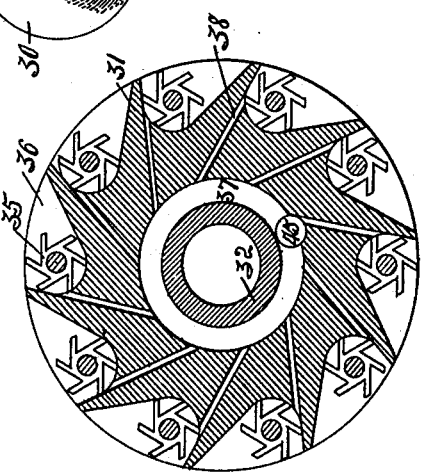
WITNESSES:
C. H. Bills.
M. G. Gaskell.
INVENTOR.
Henry L. Bock,
By Owen & Owen,
His attys.
THE NORRIS PETERS CO., WASHINGTON, D. C.

UNITED STATES PATENT OFFICE.

HENRY L. BOCK, OF TOLEDO, OHIO, ASSIGNOR TO WILLIAM EMIL BOCK, OF TOLEDO, OHIO.

POWER-TRANSMISSION MECHANISM.

990,101.      Specification of Letters Patent.      Patented Apr. 18, 1911.

Application filed December 19, 1910. Serial No. 598,178.

*To all whom it may concern:*

Be it known that I, HENRY L. BOCK, a citizen of the United States, and a resident of Toledo, in the county of Lucas and State of Ohio, have invented a certain new and useful Power-Transmission Mechanism; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to power transmission mechanism, and has particular reference to use in connection with the mechanisms of this class shown and described in the applications of William Emil Bock for United States Letters Patent, Serial Nos. 533,812, 551,704, and 563,730, filed December 18, 1909, March 26, 1910, and May 27, 1910, and one filed under even date herewith Serial No. 598,173, but is not restricted to such use as it may be employed in any connection for which it may be adapted or appropriate.

The object of my invention is to eliminate or reduce to a minimum the friction and consequent wear between the coacting surfaces of the meshing drive and driven gears of mechanisms of this type, whereby the life of the gears is materially prolonged, an easy and noiseless running of the coacting parts insured, and the use of worm driven power transmission mechanisms in automobiles or for other high speed purposes rendered practicable.

The invention is fully described in the following specification, and while, in its broader aspect, it is capable of embodiment in numerous forms, a preferred and two modified forms of the same are illustrated in the accompanying drawings, in which,—

Figure 1 is a section through a power transmission mechanism equipped with my invention. Fig. 2 is a transverse section on the line $x$ $x$ of Fig. 1 with parts broken away. Fig. 3 is a view of one of the roller teeth of the driven gear and a portion of the driving band therefor. Fig. 4 is a portion of a gear with a slightly modified form of driving band. Fig. 5 is a face of a portion of the crown gear illustrating another means of driving the roller teeth thereof in unison. Figs. 6 and 7 are different details of another form of my invention, and Figs. 8, 9, 10, 11 and 12 are different details and sectional views of a form of my invention in which the rotation of the gear rollers is influenced by fluid circulation.

In the use of power transmission mechanisms employing a worm drive, considerable difficulty has been experienced by reason of the rapid wearing of the coacting surfaces of the worm and roller teeth of the driven gear. After considerable experimenting it has been found that this was due to the very material loss in the speed of rotation of the respective rollers forming the gear teeth upon their spindles during the time the rollers are out of mesh with the worm, and this is augmented if the rollers pass through lubricating oil in an inclosing case. This loss of speed of the rollers causes a relative slipping of the worm and each roller as it moves into mesh therewith until the roller has attained the maximum speed at which the worm will drive it. It is evident that the greatest wear on the worm occurs at the point of first contact of the rollers therewith, as the greatest slipping of the coacting surfaces occurs at such point, thus causing the worm to soon acquire an unevenness which will materially affect the efficiency of the mechanism and cause it to have a noisy action.

The purpose of the present invention contemplates broadly the provision of means for driving the rollers of the driven gear in unison and at uniform speed, whereby each roller, as it moves into mesh with the registering worm, has the same speed of rotation upon its spindle as the preceding roller which is either still in mesh with or has just left the worm, thus preventing any wear of the coacting parts consequent upon a relative slipping of the same.

Referring to the drawings, 1 designates a worm, which is mounted on a drive shaft 2, and 3 the driven member or gear, which, in the present instance, is shown as communicating rotation to a driven shaft or axle 4 through a suitable differential mechanism 5. The gear 3 is of the crown type and its teeth comprise rollers 6 which are mounted for free rotation on spindles 7 projecting from the gear body or web.

A simple and preferred means of accomplishing a uniform driving of the rollers 6 of the gear 3, is illustrated in Figs. 1, 2 and 3, and consists in providing the inner or large end of each roller with an annular ridge or shoulder 8, which is substantially V-shape in cross-section, and encircling all of the roller of the gear with a common ring or band 9, the inner surface of which is fashioned to seat over and frictionally coact with the ridges or shoulders 8 of the rollers to effect a uniform driving of the same. The ring or band 9 is shown as being formed of two annular flat metal parts, which are secured together adjacent their outer edges and have their inner portions spaced to provide a seat V-shaped in cross-section for receiving the ridges 8 of the rollers. This construction of ring is found to provide a very efficient means of driving the rollers at uniform speed during a running of the mechanism. A uniform driving of the rollers of the driven gear may be accomplished in numerous other ways however, as is shown by reference to Figs. 4 to 10 inclusive.

In Fig. 4 the construction of the roller driving ring is changed slightly from that shown in the preceding figures, in that it comprises an annular band 10 having one edge thereof provided with an internal flange 11, the inner face of which is tapered to conform to the coacting side of the ridge 8 of each of the rollers, while the opposite edge thereof projects a distance beyond the roller ridges and is provided with an internal projecting flange 12. A spring pressed ring 13 is disposed within the extended portion of the ring 10 and bears against the roller ridges 8 in opposition to the flange 11 of the outer ring whereby the ridges are frictionally gripped between the flange 11 and ring 13. The ring 13 has pins 14 projecting from its outer side and working through registering apertures in the flange 12, and these pins are encircled by coiled compression springs 15, which have their opposite ends thrust against the flange 12 and ring 13 to yieldingly hold the latter seated against the coacting side of the roller ridges 8.

A positive form of driving the rollers 6 of the driven gear in unison is shown in Fig. 5 and consists in substituting gear teeth 16 for the ridges 8 of the rollers, and mounting idler gears 17 on the gear body in the spaces between the rollers, with such gears in mesh with the teeth 16 of the rollers 6.

In Figs. 6 and 7, 20 designates the driven gear and 21 the roller teeth thereof. The spindles 22 of the rollers 21 project from the rear side of the gear 20 or from that opposed to the rollers 21 and each carries a pulley member 23, which is shown in the present instance as comprising a part which is fixed to the spindle to rotate therewith and a part 24 which is influenced to move toward its companion by a spring 25. The two parts of each pulley 23 coöperate to form a V-groove periphery into which a correspondingly shaped encircling band 26 works as indicated. The band 26 is intended to encircle all of the pulley members of a gear and to coact with at least a portion of the same to communicate uniform rotation thereto. If desired, a ring 27 of a shape corresponding to the ring 26 may be disposed within the space formed by the pulleys 23 and coact therewith to assist the ring 26 in uniformly driving all of the pulleys 23 and the attached rollers 21. It is found in practice that when two bands are used, such as 26 and 27, to impart uniform rotation to the rollers, and the rollers pass through oil when out of engagement with the driving worm, the circulation of the oil occasioned by the rapidly rotating rings 26 and 27 in opposite directions, as indicated by the arrows in Fig. 7, will cause a portion of the pulleys 23, or the rollers, if the rings 26 and 27 be engaged directly therewith, to rotate in unison with the pulleys or rollers which have direct contact with the driving rings. To illustrate this, alternate ones of the pulleys 23 are shown in Fig. 7 as being of less diameter than the others to prevent direct contact thereof with the driving rings 26 and 27 so that they will not be driven by frictional contact with the rings, the smaller ones of the pulleys being designated 28.

In Figs. 8 to 12 inclusive, 30 designates a drive worm, 31 the driven gear which is loosely mounted on the hollow shaft 32 and is provided with roller teeth 33 for meshing with the worm. The spindles 34 of the rollers 33 are rotatably mounted within the gear body 31 and each has a wheel 35 provided with peripheral buckets mounted within a registering pocket 36 provided in the periphery of the gear, as shown in Figs. 8 and 12. An endless channel 37 is located within the central portion of the gear body 31 around its axis and this channel has communication through a plurality of passages 38 with each of the pockets 36. The passages 38 are so disposed as to form jets for directing fluid passing outwardly therethrough upon the vanes of the wheels 35 to drive the same. A gear pump is carried within the gear 31 and actuated by a rotation of such gear to pump oil or other suitable fluid to the channel 37 and from it through the passages 38 by which it is directed in a multiplicity of streams upon the wheels 35. The pumping means is shown in the present instance as comprising a gear 39 which is disposed within a socket 40 in the gear 31 and keyed to the shaft 32, the shaft 32 being of a stationary nature. The opening 40 is radially enlarged at one side thereof as at 41 to receive a pinion or small gear 42, which is carried by a spindle 43 within the gear in mesh with the gear 39. A plate 44 closes the outer side of the opening 40, 41, as indicated. Leading from the opening 41 at one side of the pinion 42 is a passage 45 which communicates with the channel 37. The plate 44 has its inner side formed with a channel 46 around the shaft 32 which channel registers with an opening 47 from the interior of said shaft and has an enlargement 48 in register with the pumping chamber 41 at the side of the gear 42 opposed to the passage 45. With this construction oil is intended to circulate through the shaft 32 from within the gear case, thence flows through the opening 47 therein into the passage 46, 48 in the plate 44 thence to the pumping chamber 41 at the side of the gear 42 opposed to the passage 48. From this point the oil is forced by the action of the gear 42 to the opposite side of the chamber 41, through the passage 45 and into the channel 37 from whence it is discharged through the jet passages 38 against the respective wheels 35 with sufficient force to rapidly drive such wheels and the rollers 33 attached to the spindles therewith. The oil after leaving the gear thence flows to and through the shaft 32 and follows the course above described.

In a test to which the mechanism shown was subject, it was found that after running fifty miles with the roller driving means eliminated, the wear of the worms and coacting rollers was quite perceptible, whereas, with the use of means for driving the rollers of the driven gear in unison, the mechanism was run on high speed an equivalent of five thousand road miles without any perceptible wear on the coacting parts of the gears. From this it is evident that the use of some means for driving all of the rolls of the driven gear at uniform speed is of the greatest importance to the practicability of a worm driven mechanism of this character, and that without it the mechanism is utterly impractical for use in automobiles, boats or the like.

I wish it understood that my invention is not limited to any specific construction or arrangement of the parts except in so far as such limitations are specified in the claims.

Having thus described my invention, what I claim as new and desire to secure by Letters Patent, is,—

1. In a power transmission mechanism, the combination with a driving worm, and a driven gear having roller teeth, of means for causing the roller teeth of the gear to have substantially uniform rotation relative to the gear body.

2. In a power transmission mechanism, the combination with a drive gear, and a driven gear having roller teeth, of means for causing the roller teeth of the driven gear to have substantially uniform rotation upon their respective axes.

3. In a power transmission mechanism, the combination with a drive gear, and a driven gear having roller teeth, of means actuated by an operation of such mechanism for causing the roller teeth to have continuous substantially uniform rotation upon their respective axes.

4. In a power transmission mechanism, the combination of worm driving means, a member driven by said means and having roller teeth for successively moving into mesh therewith, and means coacting with a portion at least of the roller teeth to rotate the same at uniform speed relative to the member body.

5. In a power transmission mechanism, the combination with a drive member, and a driven member having roller teeth for meshing with the drive member, of means coacting with a portion at least of said roller teeth to impart uniform rotation thereto upon their respective axes.

6. In a power transmission mechanism, the combination with a drive member, and a driven member having roller teeth for meshing with the drive member, of rotatable means coacting with said roller teeth to cause like rotation to be communicated from any one of such roller teeth to the others.

7. In a power transmission mechanism, the combination of a drive member, a driven member having roller teeth for meshing with the drive member, and rotary annular means coacting with all of the roller teeth to impart continuous uniform rotation to such teeth during a running of the mechanism with the drive and driven member in mesh.

8. In a power transmission mechanism, the combination of a drive member, a driven member having roller teeth projecting laterally therefrom, and a band coacting with all of said roller teeth to impart like rotation from any one of such rollers to the others thereof in unison.

9. In a power transmission mechanism, the combination with a drive member, a driven member having roller teeth laterally projecting therefrom, and an annular member encircling said roller teeth and frictionally coacting with all of the same to impart like rotation from any one of such rollers to the others thereof.

10. In a power transmission mechanism, the combination with a drive worm, and a driven member having roller teeth for meshing with said worm, of an annular member encircling such roller teeth and coacting therewith for imparting like rotation from any one to the others thereof about their respective axes.

11. In a power transmission mechanism, the combination with a drive worm, and a crown gear having roller teeth for meshing with said worm, of an annular member frictionally coacting with all of said rollers to impart like rotation from any one to the others thereof about their respective axes.

12. In a power transmission mechanism, the combination of a drive worm, a crown gear having roller teeth, the rollers of such teeth being provided at their inner ends with annular ridges, and means encircling said rollers as a whole and frictionally coacting with the ridges on said rollers to cause said rollers to uniformly rotate upon their respective axes.

In testimony whereof, I have hereunto signed my name to this specification in the presence of two subscribing witnesses.

HENRY L. BOCK.

Witnesses:
C. W. OWEN,
E. E. THOMAS.

Copies of this patent may be obtained for five cents each, by addressing the "Commissioner of Patents, Washington, D. C."